(12) United States Patent
Throngnumchai

(10) Patent No.: US 6,969,968 B2
(45) Date of Patent: Nov. 29, 2005

(54) CONTROL DEVICE AND CONTROLLING METHOD OF INVERTER

(75) Inventor: Kraisorn Throngnumchai, Yokohama (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 11/014,701

(22) Filed: Dec. 20, 2004

(65) Prior Publication Data

US 2005/0140330 A1   Jun. 30, 2005

(30) Foreign Application Priority Data

Dec. 25, 2003 (JP) .......................... P2003-431112

(51) Int. Cl.[7] .............................................. B60L 9/18
(52) U.S. Cl. .................... 318/807; 318/811; 318/606; 318/599; 318/432
(58) Field of Search ..................... 318/807, 811, 606, 318/599, 432

(56) References Cited

U.S. PATENT DOCUMENTS

| | | | |
|---|---|---|---|
| 3,577,052 A * | 5/1971 | Bauer | 318/798 |
| 3,753,063 A * | 8/1973 | Graf | 318/806 |
| 3,935,518 A * | 1/1976 | Yatsuk et al. | 318/805 |
| 4,186,334 A * | 1/1980 | Hirata | 318/805 |
| 4,322,671 A * | 3/1982 | Kawada et al. | 318/798 |
| 4,599,549 A * | 7/1986 | Mutoh et al. | 318/798 |
| 4,651,079 A * | 3/1987 | Wills | 318/811 |
| 4,663,702 A * | 5/1987 | Tanaka | 363/65 |
| 4,869,592 A * | 9/1989 | Bergh | 356/464 |
| 4,905,135 A * | 2/1990 | Unehara et al. | 363/98 |
| 5,532,569 A * | 7/1996 | Tanamachi et al. | 318/802 |
| 5,625,264 A * | 4/1997 | Yoon | 318/254 |
| 5,781,423 A * | 7/1998 | Inarida et al. | 363/41 |

FOREIGN PATENT DOCUMENTS

JP        2000-184729 A        6/2000

* cited by examiner

*Primary Examiner*—Rita Leykin
(74) *Attorney, Agent, or Firm*—McDermott Will & Emery LLP

(57) ABSTRACT

A carrier wave frequency generating unit 9 modulates a frequency f of a carrier wave in a triangular shape. Occurrence of drawbacks due to the frequency f of the carrier wave can thereby be prevented. Because the frequency f of the carrier wave can be easily computed and estimated, a delay time of control, which is due to time for computing the frequency or an integration constant of PID control, can be kept to a minimum, and motor efficiency can be prevented from deteriorating. Because a control delay time can be estimated easily, it is possible to prevent carrying out of delay compensation by feed forward, and to prevent the motor efficiency from deteriorating.

7 Claims, 7 Drawing Sheets

CONTROL DEVICE AND CONTROLLING METHOD OF INVERTER

BACKGROUND OF THE INVENTION

The present invention relates to a control device and a controlling method of an inverter that outputs a sinusoidal AC voltage supplied to a motor, by pulse width modulating (PWM) output of a DC power source, and more specifically, the present invention relates to a technique for preventing occurrence of drawbacks caused by a carrier wave, without deteriorating motor efficiency.

There is conventionally known a control device that detects current values of respective phases of a U phase, a V phase, and a W phase of a 3-phase brushless DC motor (hereinafter, "motor"), and PID (proportion/integration/differentiation) controls detected values and generates PID control values so as to follow a sinusoidal current command value, and switches on/off of a switching element structuring an inverter according to a relationship of magnitudes between the PID control values and a triangular wave-shaped carrier wave (hereinafter, "carrier wave") in order to modulate the PID control values. According to such a control device, it is possible to carry out feedback control so that sinusoidal currents flow at the respective phases of the U phase, the V phase, and the W phase of the motor.

Such an inverter is generally called a triangular wave comparing type sine wave PWM inverter. It is known that, as a switching operation is carried out, this triangular wave comparing type sine wave PWM inverter generates drawbacks due to a frequency of the carrier wave, such as mechanical/electrical vibrations, noise, sound, EMI (ElectroMagnetic Interference), and the like. Therefore, as disclosed in Japanese Patent Application Laid-Open No. 2000-184729, in order to decrease mechanical/electrical vibrations due to the frequency of the carrier wave in conventional control devices, a peak value of a spectrum is kept low by randomly switching the frequency of the carrier wave and diffusing the spectrum of the carrier wave.

SUMMARY OF THE INVENTION

However, generally, the integration constant at the time of carrying out PID control depends on the frequency of the carrier wave. Therefore, if the frequency of the carrier wave is switched randomly as in the conventional control device, computation of the integration constant becomes complex, and a delay time of the PID control increases. Further, when controlling the inverter, usually, in order to compensate for a control delay time such as a delay time arising in order to sample currents of the respective phases, a delay time of the PID control, a delay time due to a control period, or the like, the control delay time is estimated, and delay compensation according to feed-forward is carried out. However, when the frequency of the carrier wave is switched randomly as in the conventional control device, it is difficult to estimate the control delay, and therefore, the control delay cannot be compensated for. For these reasons, according to conventional control devices, there are cases in which current cannot be controlled to a sine wave shape with sufficient accuracy, and the motor efficiency deteriorates.

The present invention has been achieved in order to solve the above problems, and the invention provides a control device and a controlling method of an inverter that prevent occurrence of drawbacks due to a carrier wave, without deteriorating the motor efficiency.

In order to overcome the above problems, the present inventors have found, as a result of having repeatedly engaged in researches, that, by modulating the frequency of the carrier wave such that the frequency of the carrier wave changes in a predetermined waveform, the occurrence of drawbacks due to the carrier wave can be prevented without deteriorating the motor efficiency.

One aspect of a control device of an inverter according to the present invention, based on the aforementioned findings, provides a control device of an inverter switching a positive electrode/negative electrode of a DC power source connected to a load by switching on/off of a switching element, and supplying a sinusoidal AC current to the load, comprising: a current command generating unit that generates a sinusoidal current command value; a triangular carrier wave generating unit that generates a triangular carrier wave; a PID control unit that PID controls an output value of the inverter to follow the current command value; a comparator that controls on/off operation of the switching element according to a relationship of magnitudes between an output value of the PID control unit and the carrier wave; and a carrier wave frequency generating unit that modulates a frequency such that a frequency of the carrier wave changes in a predetermined wave shape.

Another aspect of a controlling method of an inverter according to the present invention, based on the aforementioned findings, provides a controlling method of an inverter switching a positive electrode/negative electrode of a DC power source connected to a load by switching on/off of a switching element, and supplying a sinusoidal AC current to the load, comprising the processes of: generating a sinusoidal current command value; generating a triangular carrier wave; PID controlling an output value of the inverter to follow the current command value; controlling on/off operation of the switching element according to a relationship of magnitudes between an output value of the inverter after the PID control and the carrier wave; and modulating a frequency such that a frequency of the carrier wave changes in a predetermined wave shape.

DETAILED DESCRIPTION OF THE PREFERRED EMBODIMENTS

Figure 1:
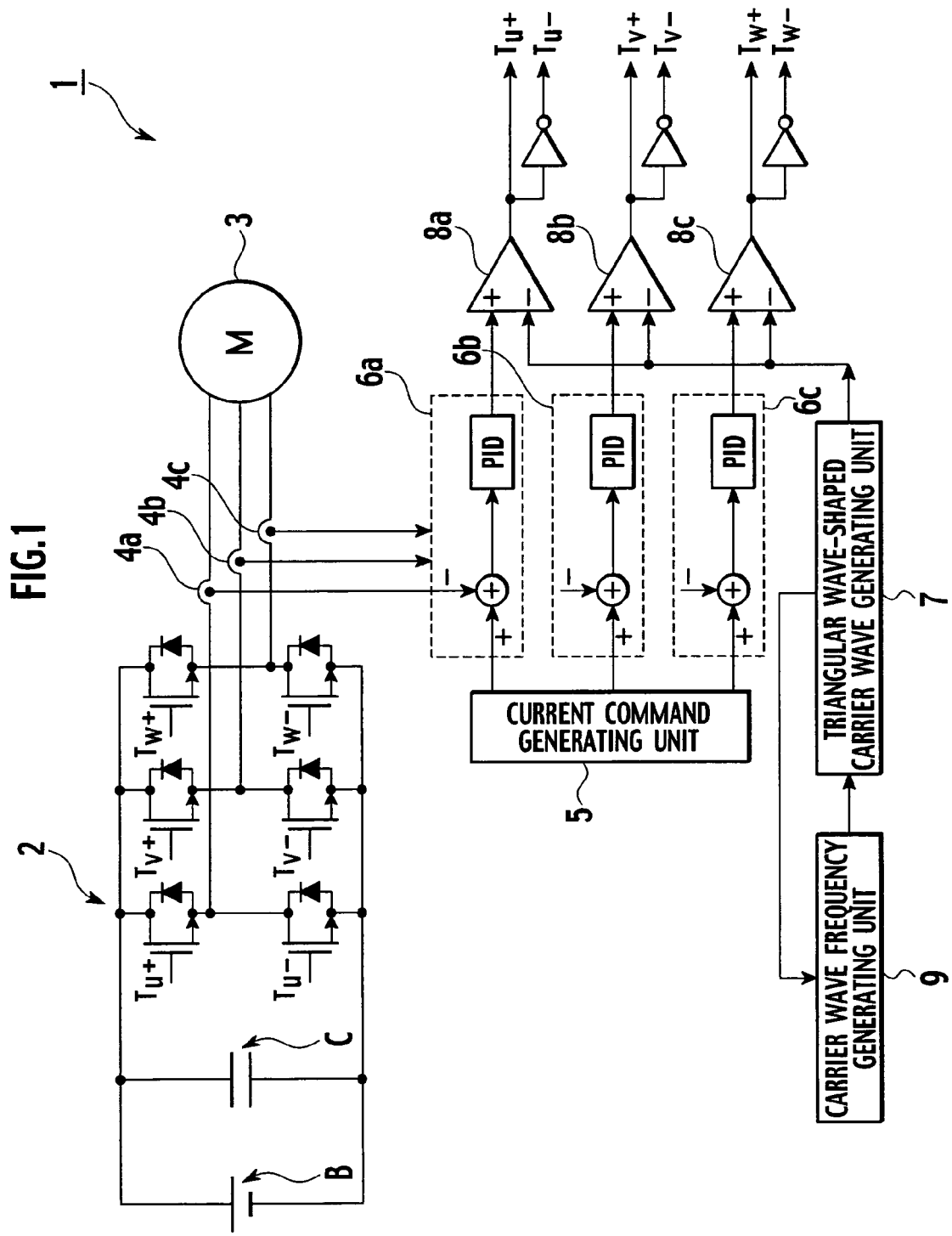
FIG. 1 is a diagram of a structure of an inverter system according to a first embodiment of the present invention.

The present invention can be applied to an inverter system, such as shown in FIG. 1, which has an inverter that supplies a sinusoidal AC current to a motor by PWM modulating output of a DC power source. Hereinafter, structures and operations of inverter systems, which are first, second, and third embodiments of the present invention, are described with reference to the accompanying drawings.

First Embodiment

The structure and operation of an inverter system that is a first embodiment of the present invention are first described with reference to FIGS. 1 to 5.

As shown in FIG. 1, an inverter system 1 that is the first embodiment of the present invention has, as main structural elements thereof, a PWM inverter 2, a 3-phase brushless DC motor (hereinafter, "motor") 3, current sensors 4a, 4b, 4c, a current command generating unit 5, PID control units 6a, 6b, 6c, a triangular wave-shaped carrier wave generating unit 7, comparators 8a, 8b, 8c, and a carrier wave frequency generating unit 9.

The PWM inverter 2 has six switching elements Tu+, Tu−, Tv+, Tv−, Tw+, Tw− that, according to control of the comparators 8a, 8b, 8c, select a positive electrode or a negative electrode of a DC power source formed from a battery B and a capacitor C, and connect the selected electrode to the respective U phase, V phase, and W phase electrodes of the motor 3. These switching elements are structured by semiconductor elements such as IGBT (Insulated Gate Bipolar Transistors).

The current sensors 4a, 4b, 4c respectively detect U phase, V phase, and W phase current values supplied from the PWM inverter 2 to the motor 3. The current command generating unit 5 generates sinusoidal current command values such that detected values of the current sensors 4a, 4b, 4c are converted into sinusoidal AC currents. The PID control units 6a, 6b, 6c PID control the detected values of the current sensors 4a, 4b, 4c, such that the detected values of the current sensors 4a, 4b, 4c follow the current command values that the current command generating unit 5 generates. The triangular wave-shaped carrier wave generating unit 7 generates a triangular wave-shaped carrier wave.

The comparators 8a, 8b, 8c compare relationships of magnitudes between output values of the PID control units 6a, 6b, 6c and the triangular wave-shaped carrier wave, and, according to the relationships of magnitudes, input, to the PWM inverter 2, signals controlling on/off states of the switching elements Tu+, Tu−, Tv+, Tv−, Tw+, Tw− of the PWM inverter 2. To concretely describe operation of the comparator 8a by using control of the U phase switching elements Tu+, Tu− as an example, if the output value of the PID control unit 6a is greater than the triangular carrier wave, the comparator 8a applies positive voltage to the U phase of the motor by controlling the Tu+, Tu− to be in an on state and an off state, respectively. Conversely, if the output value of the PID control unit 6a is smaller than the triangular carrier wave, the comparator 8a applies negative voltage to the U phase of the motor by controlling the Tu+, Tu− to be in an off state and an on state, respectively.

The carrier wave frequency generating unit 9 varies a frequency f of the triangular carrier wave, according to timings of a maximum value and a minimum value of the triangular carrier wave inputted from the triangular wave-shaped carrier wave generating unit 7 (details are described later).

Due to the carrier wave frequency generating unit 9 executing a frequency control processing that is described hereinafter, the inverter system having such a structure can prevent the occurrence of drawbacks due to the carrier wave, without deteriorating the motor efficiency. Hereinafter, operation of the carrier wave frequency generating unit 9 at the time of executing the frequency control processing is described in detail with reference to the flowchart of FIG. 2.

Figure 2:
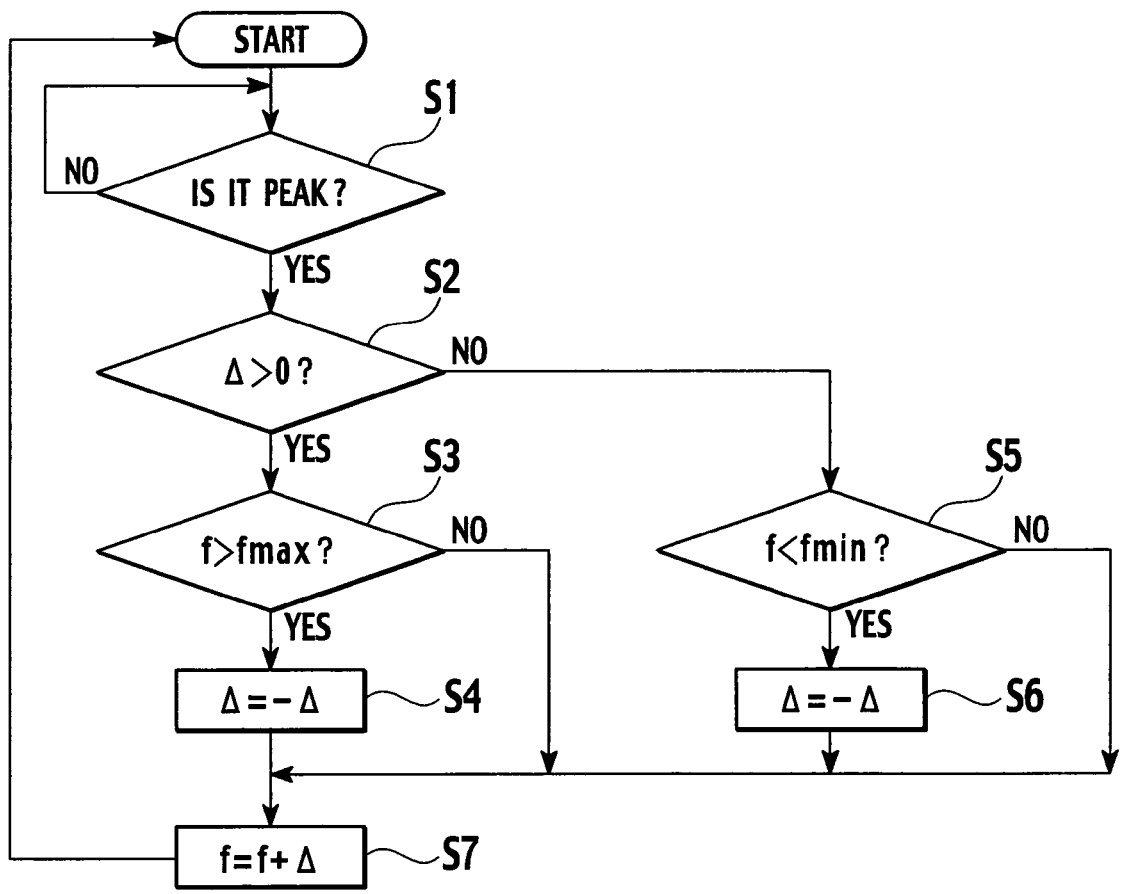
FIG. 2 is a flowchart of frequency control processing by a carrier wave frequency generating unit shown in FIG. 1.

The flowchart of FIG. 2 starts due to the triangular carrier wave (hereinafter, "carrier wave") being inputted from the triangular carrier wave generating unit 7 to the carrier wave frequency generating unit 9, and the frequency control processing proceeds to processing at step S1.

In the processing at step S1, the carrier wave frequency generating unit 9 determines whether the carrier wave inputted from the triangular carrier wave generating unit 7 is a maximum value or a minimum value (a peak). According to a determination that the carrier wave is a maximum value or a minimum value, the carrier wave frequency generating unit 9 advances the frequency control processing to processing at step S2.

In the processing at step S2, the carrier wave frequency generating unit 9 determines which of positive and negative a change value Δ of the frequency f of the carrier wave is. If the change value Δ is negative, the carrier wave frequency generating unit 9 advances the frequency control processing to processing at step S5. If the change value Δ is positive, the carrier wave frequency generating unit 9 advances the frequency control processing to processing at step S3.

At the processing of step S3, the carrier wave frequency generating unit 9 determines whether the frequency f reaches an upper limit value fmax. If results of determination show that the frequency f does not reach the upper limit value fmax, the carrier wave frequency generating unit 9 advances the frequency control processing to processing at step S7 so as not to change the change value Δ. If the frequency f reaches the upper limit value fmax, the carrier wave frequency generating unit 9 advances the frequency control processing to processing at step S4.

In the processing at step S4, the carrier wave frequency generating unit 9 transforms the change value Δ of the frequency f so that the frequency f is lowered from the upper limit value fmax. The processing at step S4 is thereby completed, and the frequency control processing advances from the processing at step S4 to the processing at step S7.

In the processing at step S5, the carrier wave frequency generating unit 9 determines whether the frequency f reaches a lower limit value fmin. If results of determination show that the frequency f does not reach the lower limit value fmin, the carrier wave frequency generating unit 9 advances the frequency control processing to the processing at step S7 so as not to change the change value Δ. If the frequency f reaches the lower limit value fmin, the carrier wave frequency generating unit 9 advances the frequency control processing to processing at step S6.

In the processing at step S6, the carrier wave frequency generating unit 9 transforms the change value Δ of the frequency f so that the frequency f is increased from the lower limit value fmin. The processing at step S6 is thereby completed, and the frequency control processing advances from the processing at step S6 to the processing at step S7.

Figure 3:
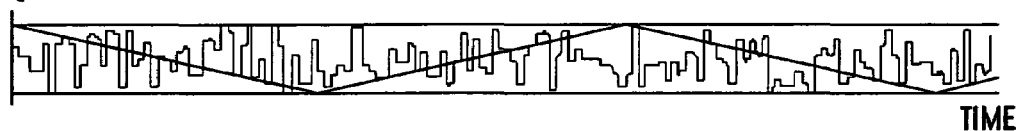
FIG. 3 is a diagram showing changes over time in a frequency of a carrier wave in the invention of the present application and in a conventional inverter system.
Figure 4:
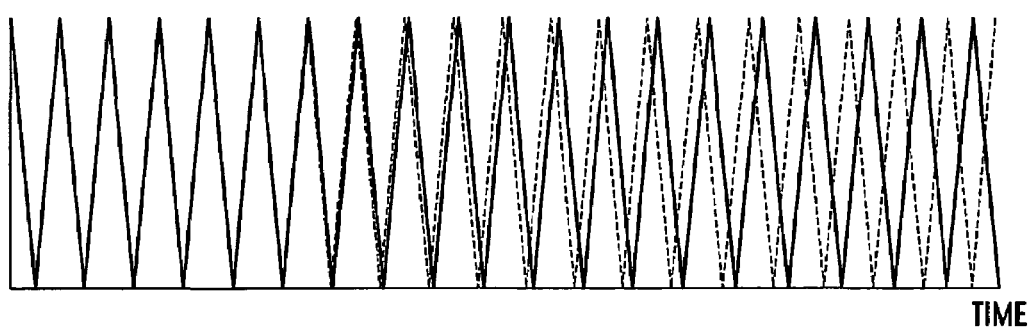
FIG. 4 is a diagram showing changes over time in the carrier wave in the invention of the present application and in a conventional inverter system.

In the processing at step S7, the carrier wave frequency generating unit 9 inputs, to the triangular wave-shaped carrier wave generating unit 7 and as the carrier wave frequency f of the next period, a value obtained by adding the change value Δ determined by the above processings to the current frequency f. The processing at step S7 is thereby completed, and the frequency control processing returns from the processing at step S7 to the processing at step S1. According to this series of frequency control processings, as shown in FIG. 3, by reducing the carrier wave frequency f monotonically in a given section and increasing the carrier wave frequency f monotonically in a given section, the frequency of the carrier wave is modulated to a triangular shape, and a triangular carrier wave such as shown by the solid line in FIG. 4 can be generated. FIGS. 3 and 4 show changes over time in the carrier wave frequency when the frequency of the carrier wave is modulated randomly and in a triangular shape, and changes over time in the carrier wave when the carrier wave frequency is constant (the dotted line) or is modulated in a triangular shape (the solid line), respectively. While in this embodiment, as shown in FIG. 3, the frequency of the carrier wave is changed rectilinearly, the frequency may also be changed in any type of shape, such as, for example, changed in a curve, provided that an amount of change in the frequency f of the carrier wave does not become large, such as a case in which the frequency is changed randomly.

Changes in the motor phase current when the carrier wave frequency f is fixed and is modulated randomly and in a triangular shape, are described with reference to FIG. 5. FIGS. 5A to 5C show results of simulation of spectra of the motor phase currents when the carrier wave frequency f is fixed and is modulated randomly and in a triangular shape.

Figure 5A:
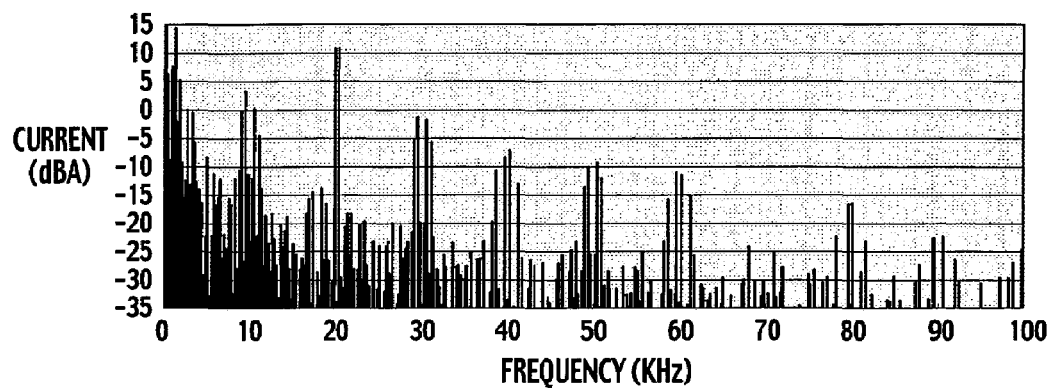
FIGS. 5A to 5C are simulation waveforms of a spectrum of a motor phase current when the frequency of the carrier wave is fixed, modulated randomly, and in a triangular shape.
Figure 5B:
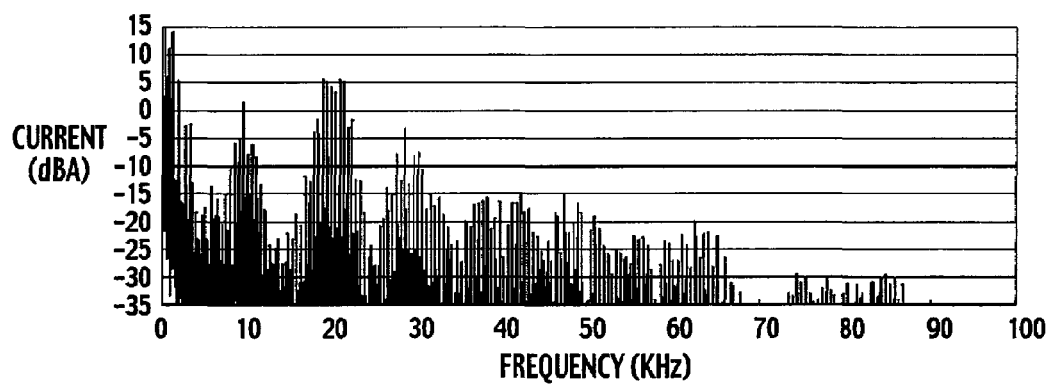
Figure 5C:
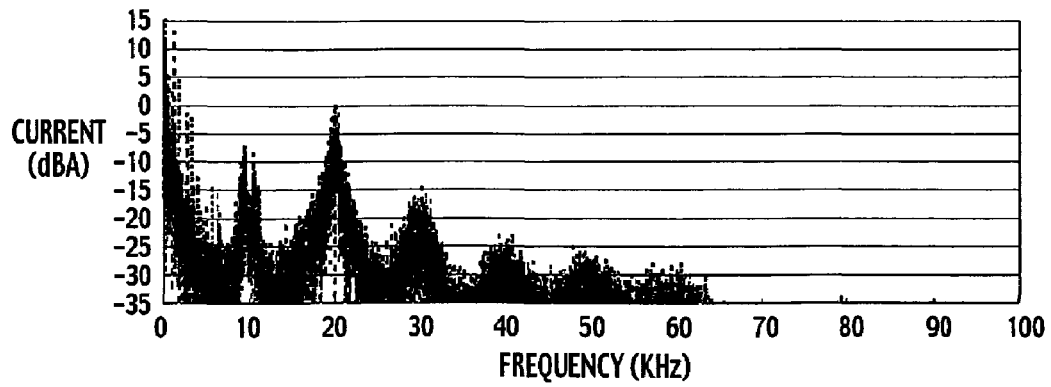

As is clear from FIGS. 5A to 5C, it is understood that the peak of the higher harmonic of the motor phase current becomes smaller in the order of fixed, randomly modulating, and modulating in a triangular shape. Specifically, at 20 [kHz], a peak value when the carrier wave frequency f is fixed is 11 [dBA], whereas it is 5 [dBA] in the case of randomly modulating and decreases to 0 [dBA] in the case of modulating in a triangular shape. Further, at 30 [kHz], the peak value when the carrier wave frequency is fixed is −1 [dBA], whereas it is −4 [dBA] in the case of randomly modulating and decreases to −15 [dBA] in the case of modulating in a triangular shape.

Accordingly, when the frequency of the carrier wave is modulated in a triangular shape, as compared with a case in which the carrier wave frequency is modulated randomly as is the case conventionally, the peak value of the spectrum of the motor phase current can be lowered even more, and therefore, the occurrence of drawbacks due to the frequency of the carrier wave can be prevented even more effectively.

As is understood from the above explanation, according to the inverter system 1 of the first embodiment of the present invention, the carrier wave frequency generating unit 9 modulates the frequency f of the carrier wave in a triangular shape. Therefore, as compared with a case in which the frequency f is modulated randomly, the occurrence of drawbacks due to the frequency of the carrier wave can be prevented even more effectively.

According to the inverter system 1 of the first embodiment, the carrier wave frequency generating unit 9 modulates the carrier wave frequency f in a triangular shape. Therefore, the carrier wave frequency f can be computed and estimated easily. According to such a structure, because the time required for computation of the frequency f and the integration constant of the PID control can be kept to a minimum, a delay time in control due to computation time can be kept to a minimum, and the motor efficiency can be prevented from deteriorating.

According to the inverter system 1 of the first embodiment, because the carrier wave frequency generating unit 9 modulates the carrier wave frequency f in a triangular shape, the control delay time can be estimated easily. According to such a structure, it is possible to prevent delay compensation by feed forward from being carried out, and to prevent the motor efficiency from deteriorating.

According to the inverter system 1 of the first embodiment, the carrier wave frequency generating unit 9 determines whether the carrier wave inputted from the triangular carrier wave generating unit 7 is a maximum value or a minimum value. If the carrier wave is a peak of a maximum value or a minimum value, the carrier wave frequency generating unit transforms the change value Δ of the frequency of the carrier wave. Therefore, it is possible to prevent an inability to recompute the integration constant because the period of control changes in the midst of the period of the carrier wave, and to prevent accuracy of current control from deteriorating. Moreover, it is possible to prevent an inability to recompute control delay compensation because the period of control changes in the midst of the period of the carrier wave, and to prevent the accuracy of the current control from deteriorating.

Second Embodiment

Figure 6:
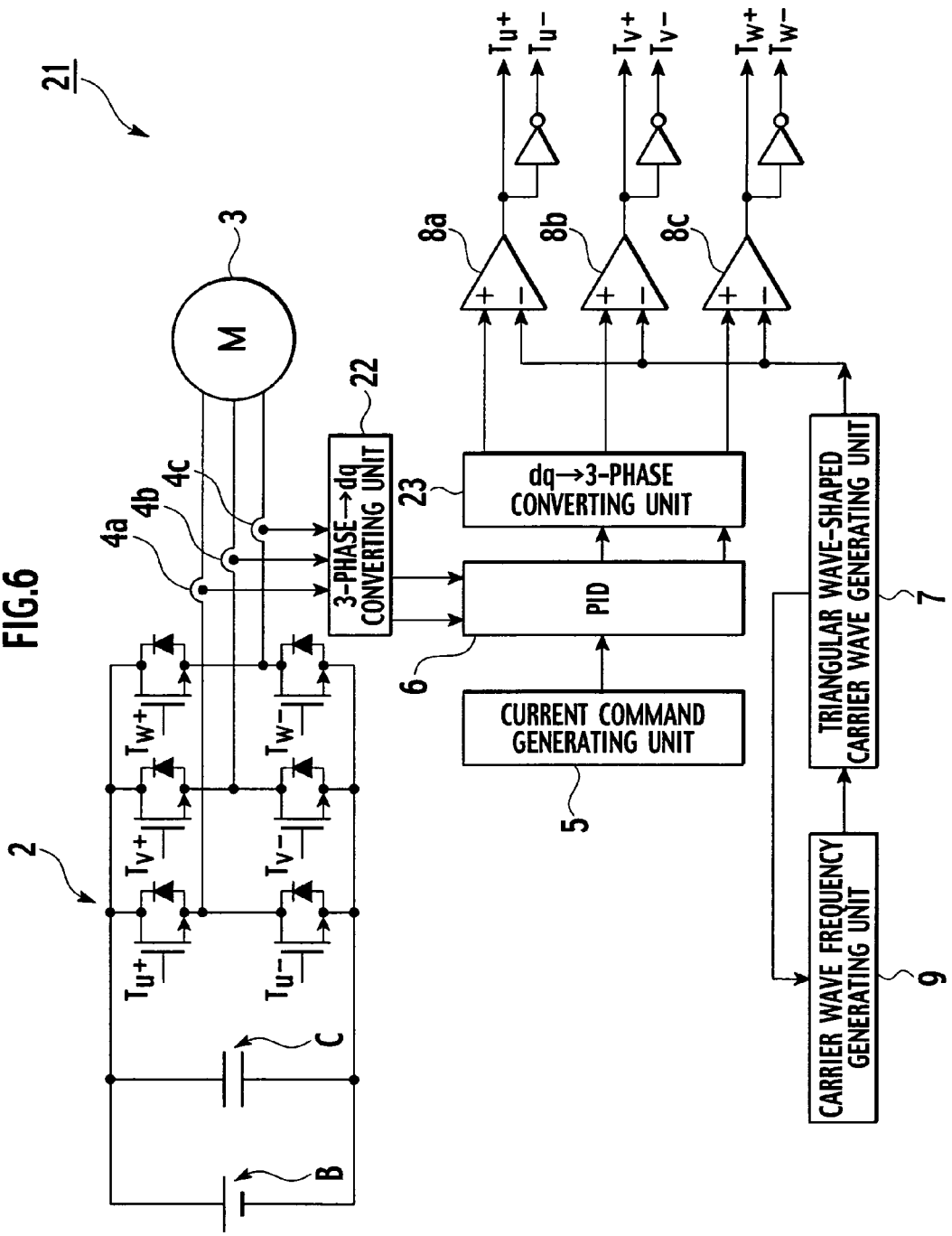
FIG. 6 is a diagram of a structure of an inverter system according to a second embodiment of the present invention.

A structure and an operation of an inverter system according to a second embodiment of the present invention are next described with reference to FIG. 6.

In the first embodiment, PID control is carried out on the sine wave command values of the respective phases of the U phase, the V phase, and the W phase. Generally, it is known that, when realizing a PID control unit in a digital form by using a microcomputer, such a method deteriorates the accuracy of the PID control. Thus, in an inverter system 21 according to the second embodiment of the present invention, as shown in FIG. 6, a 3-phase→dq converting unit 22 converts the detected value of the current sensor into a value on a dq virtual axis, and the PID control unit 6 carries out PID control on the dq virtual axis. A dq→3-phase converting unit 23 inversely converts the output value of the PID control unit 6 into a value on the 3-phase axis of the U phase, the V phase, and the W phase, and thereafter, inputs it to the comparator.

As is understood from the above description, according to the inverter system of the second embodiment, the 3-phase→dq converting unit 22 converts the detected value of the current sensor into a value on the dq virtual axis, and the PID control unit 6 carries out PID control on the dq virtual axis. The current command value thereby becomes direct current on the dq virtual axis, and therefore, PID control can easily be realized in a digital form.

According to the inverter system of the second embodiment, the PID control unit 6, the triangular carrier wave generating unit 7, the carrier wave frequency generating unit 9, the 3-phase→dq converting unit 22, and the dq→3-phase converting unit 23 can be structured in a digital form. Therefore, the inverter system can be structured inexpensively.

Third Embodiment

Figure 7:
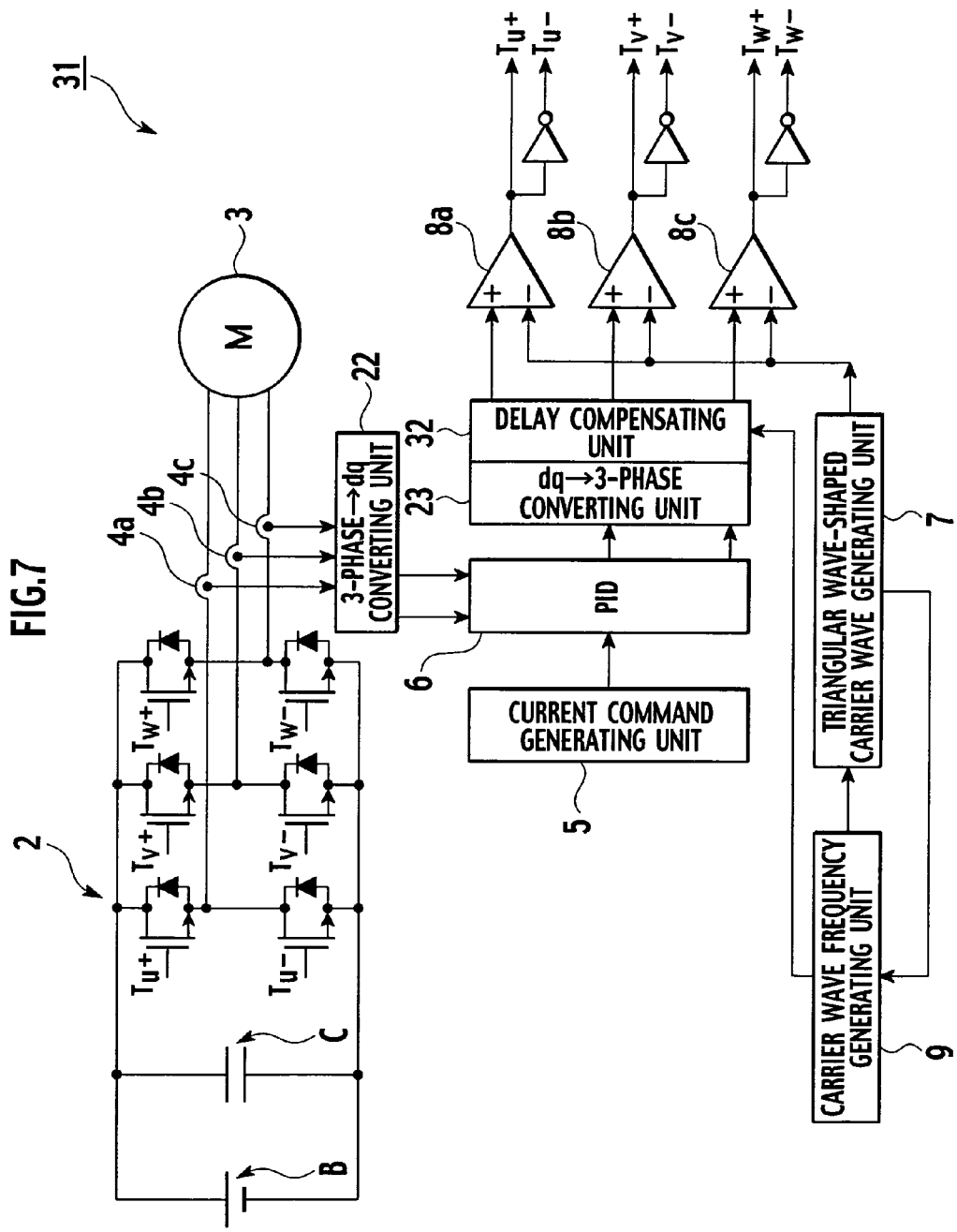
FIG. 7 is a diagram of a structure of an inverter system according to a third embodiment of the present invention.

As shown in FIG. 7, a structure of an inverter system according to a third embodiment of the present invention is described next.

As shown in FIG. 7, an inverter system 31 according to a third embodiment of the present invention differs from the structure of the inverter system 21 according to the second embodiment with regard to the point that a delay compensating unit 21 is provided at the dq→3-phase converting unit 23. On the basis of the frequency f of the carrier wave generated by the carrier wave frequency generating unit 9, the delay compensating unit 32 computes a control delay time, and corrects the current command value on the basis of results of computation.

As is clear from the above description, according to the inverter system 31 of the third embodiment, the delay compensating unit 32 computes the control delay time on the basis of the frequency f of the carrier wave. Therefore, the control delay can be accurately compensated for, and the motor efficiency can be prevented from deteriorating.

Figure 8:
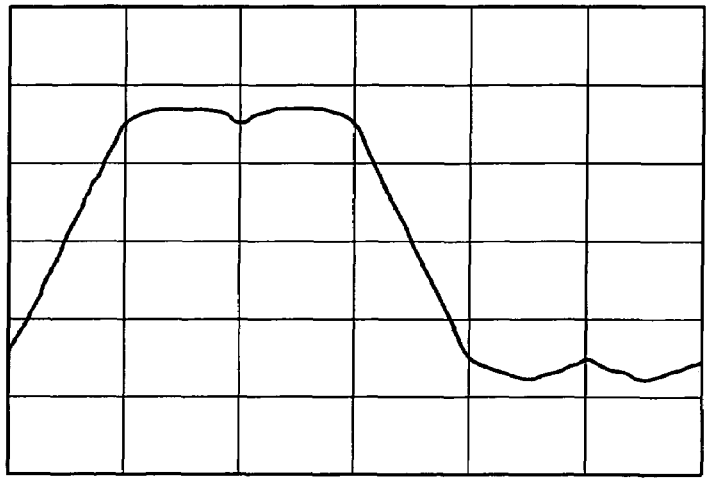
FIG. 8 is a waveform diagram of an applied example of a current command value generated by a current command generating unit according to the embodiments of the present invention.
Figure 9:
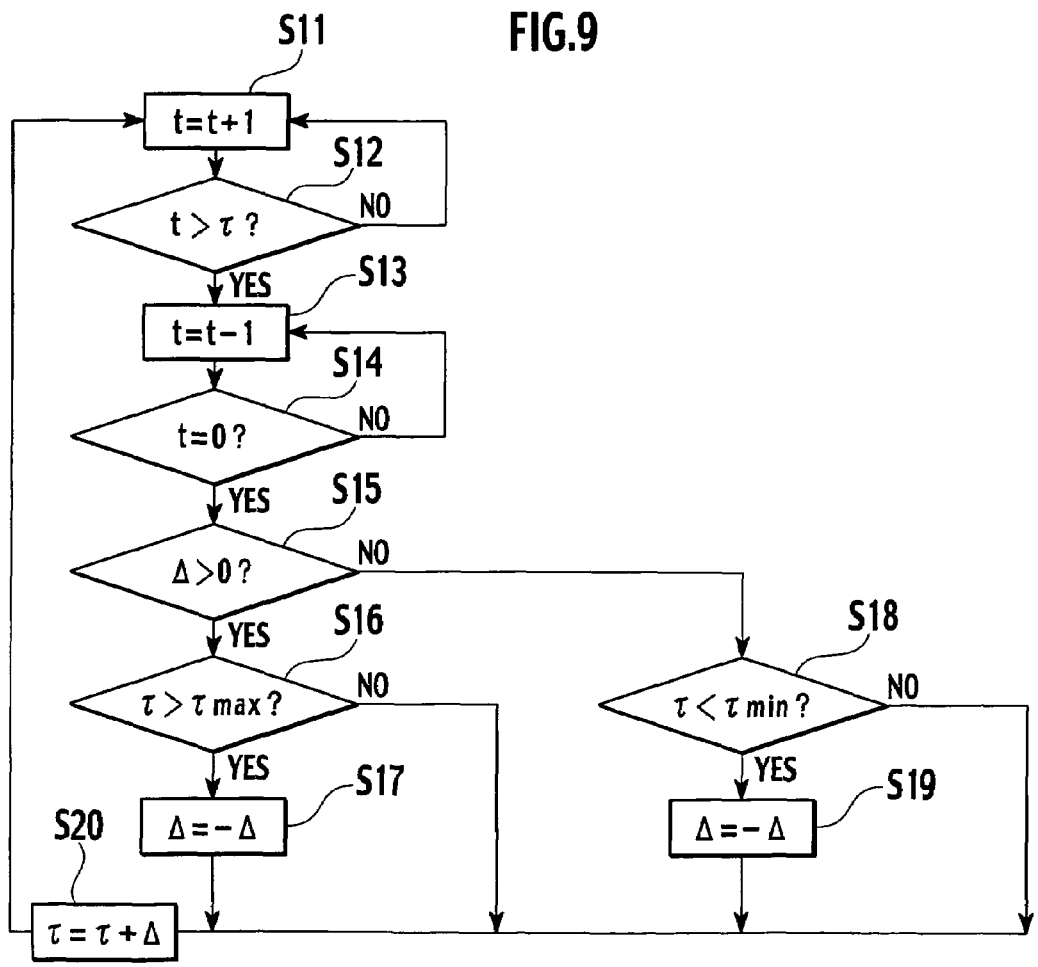
FIG. 9 is a flowchart of a flow of processings when a period of the carrier wave is modulated in a triangular shape.

Although embodiments applying the present invention as made by the present inventors are described above, the present invention is not limited by the descriptions and drawings that make up a portion of the disclosure of the present invention according to the embodiments. For example, in the above embodiments, the current command generating unit 5 generates a sinusoidal current command value, but may generate a current command value of a waveform obtained by adding a tertiary higher harmonic wave to a basic wave, or a waveform obtained by adding a triangular wave to a sine wave as shown in FIG. 8. By using a current command value of such a waveform, the efficiency of utilizing the voltage can be improved. Further, in the above-described embodiments, the frequency of the carrier wave is modulated in a triangular shape, but may be modulated into any type of waveform provided that it is a waveform that can approximate a triangular shape. Specifically, even if the period of the carrier wave is modulated in a triangular shape, the frequency is triangular in first approximation, and therefore, technical effects that are similar to those of the above-described embodiments can be obtained. The processing of modulating the period of the carrier wave into a triangular shape can concretely be carried out according to the processing of the flowchart of FIG. 9. Namely, a period t of the carrier wave is increased by 1 (step S11). According to the period t becoming greater than or equal to a predetermined period τ (step S12), the period t is decreased by 1 (step S13). When the period t whose number is reduced is 0, it is determined whether the change value Δ of the period t is greater than or equal to 0 (step S15). If the period t whose number is reduced is not 0, the routine returns to step S13. If it is determined, as a result of the processing of step S15, that the change value Δ of the period t is greater than or equal to 0, it is determined whether the period t reaches a maximum value τmax (step S16). If the period t reaches the maximum value τmax, the change value Δ of the period t is transformed (step S17). If the change value Δ of the period t is less than or equal to 0, it is determined whether the period t reaches a minimum value τmin (step S18). If the period t reaches the minimum value τmax, the change value Δ of the period t is transformed (step S19). The change value Δ determined by these processings is added to the current period τ (step S20), and thereafter, the processing again returns to the processing of step S11. Needless to say, other embodiments, examples, and operation techniques achieved by persons skilled in the art based on the above-described embodiments will all fall within the spirit of the present invention.

The entire content of a Patent Application No. TOKUGAN 2003-431112 with a filing date of Dec. 25, 2003, is hereby incorporated by reference.

What is claimed is:

1. A control device of an inverter switching a positive electrode/negative electrode of a DC power source connected to a load by switching on/off of a switching element, and supplying a sinusoidal AC current to the load, comprising:

a current command generating means for generating a sinusoidal current command value;

a triangular carrier wave generating means for generating a triangular carrier wave;

a PID control means for PID controlling an output value of the inverter to follow the current command value;

a comparing means for controlling on/off operation of the switching element according to a relationship of magnitudes between an output value of the PID control unit and the carrier wave; and a carrier wave frequency generating means for modulating a frequency such that a frequency of the carrier wave changes in a predetermined wave shape.

2. A control device of an inverter switching a positive electrode/negative electrode of a DC power source connected to a load by switching on/off of a switching element, and supplying a sinusoidal AC current to the load, comprising:

a current command generating unit that generates a sinusoidal current command value;

a triangular carrier wave generating unit that generates a triangular carrier wave;

a PID control unit that PID controls an output value of the inverter to follow the current command value;

a comparator that controls on/off operation of the switching element according to a relationship of magnitudes between an output value of the PID control unit and the carrier wave; and a carrier wave frequency generating unit that modulates a frequency such that a frequency of the carrier wave changes in a predetermined wave shape.

3. The control device of an inverter according to claim 2, wherein the carrier wave frequency generating unit determines whether an amplitude of the carrier wave reaches a maximum value or a minimum value, and modulates the frequency by decreasing or increasing the frequency of the carrier wave according to the amplitude of the carrier wave reaching the maximum value or the minimum value.

4. The control device of an inverter according to claim 2, wherein the load is a 3-phase AC motor, and has a first converting unit that converts the output value of the inverter into a value on a dq axis and inputs a converted value to the PID control unit, and a second converting unit that inversely converts the output value of the PID control unit into a value on a 3-phase axis and inputs a converted value to the comparator.

5. The control device of an inverter according to claim 2, further comprising:

a delay compensating unit that computes a control delay time on the basis of the frequency of the carrier wave, and corrects the current command value on the basis of results of computation.

6. The control device of an inverter according to claim 2, wherein the carrier wave frequency generating unit modulates the frequency such that the frequency of the carrier wave changes in a triangular shape.

7. A controlling method of an inverter switching a positive electrode/negative electrode of a DC power source connected to a load by switching on/off of a switching element, and supplying a sinusoidal AC current to the load, comprising the processes of:

generating a sinusoidal current command value;

generating a triangular carrier wave;

PID controlling an output value of the inverter to follow the current command value;

controlling on/off operation of the switching element according to a relationship of magnitudes between an output value of the inverter after the PID control and the carrier wave; and modulating a frequency such that a frequency of the carrier wave changes in a predetermined wave shape.

* * * * *